Dec. 26, 1967  B. VER NOOY  3,360,284
SPLIT T
Filed Jan. 9, 1967  2 Sheets-Sheet 1
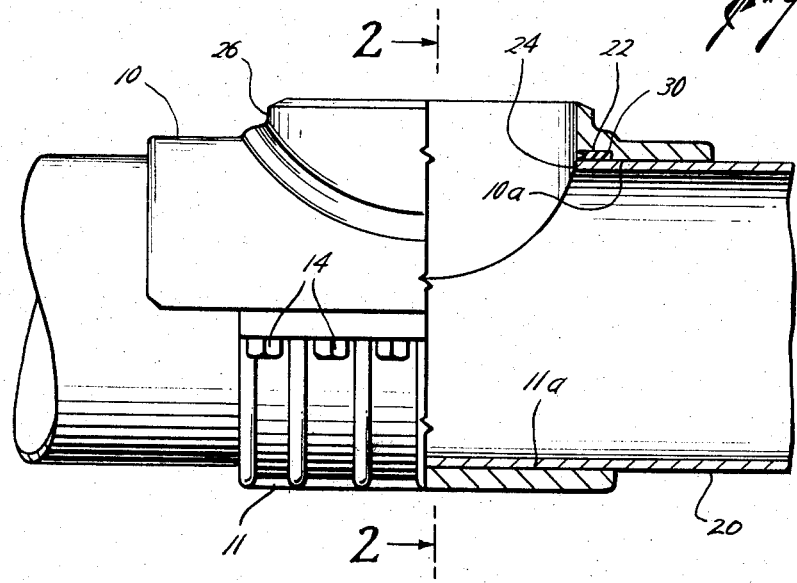
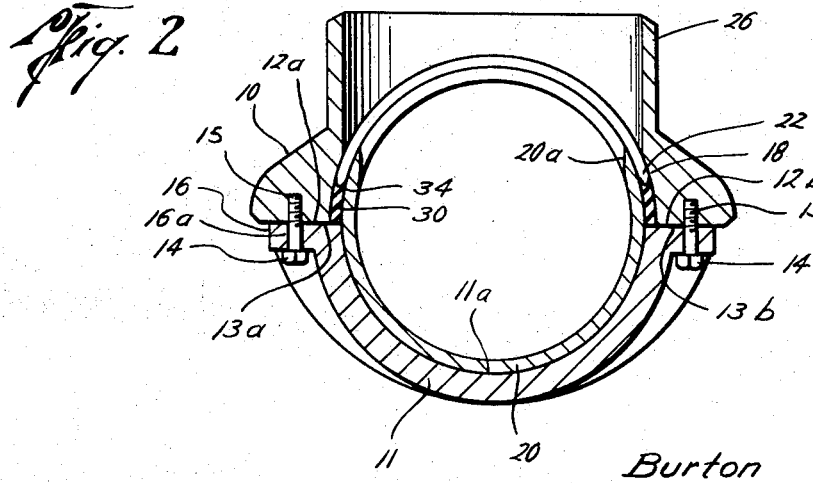
Burton Ver Nooy
INVENTOR.
BY
ATTORNEYS Dec. 26, 1967　　　　　B. VER NOOY　　　　　3,360,284
SPLIT T
Filed Jan. 9, 1967　　　　　　　　　　　　　　2 Sheets-Sheet 2
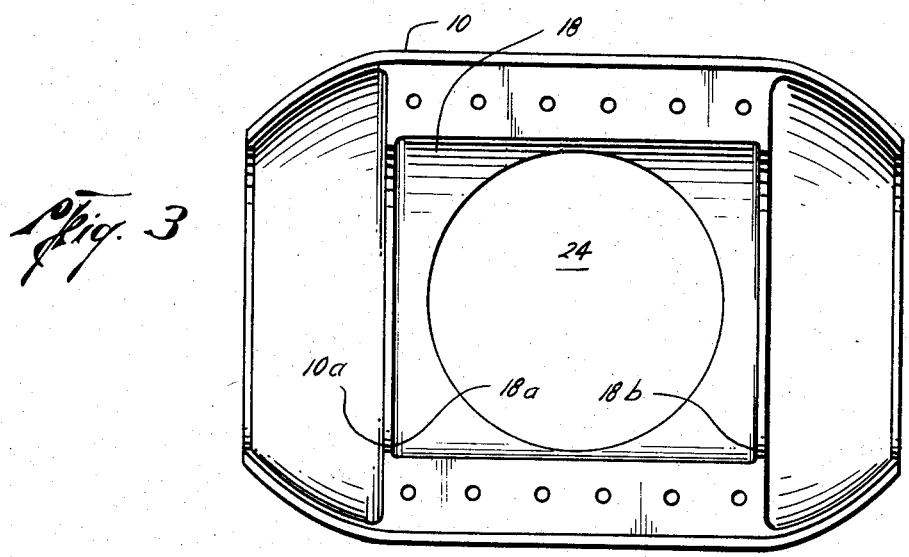
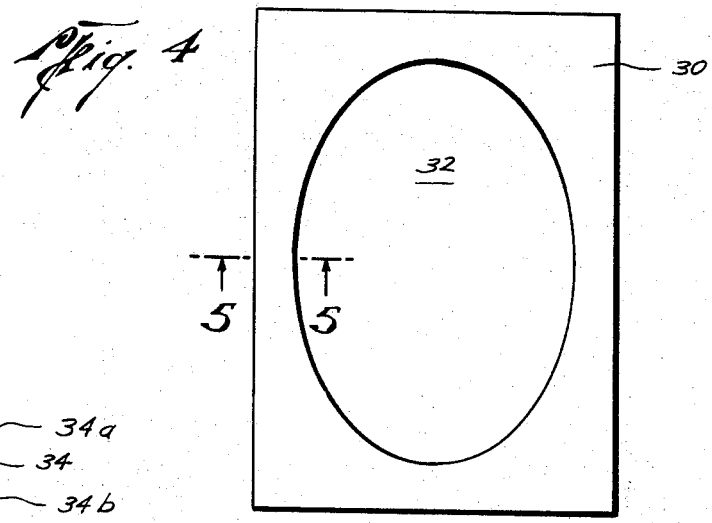
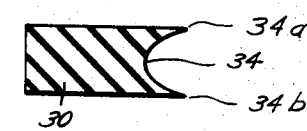
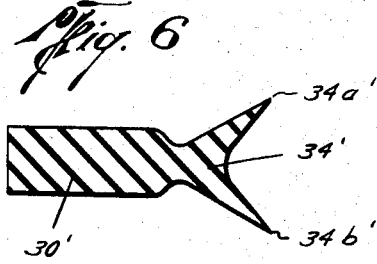 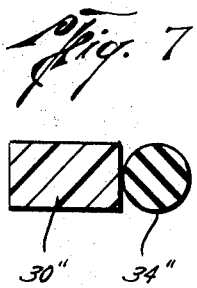
Burton Ver Nooy
INVENTOR.
BY
ATTORNEYS

United States Patent Office 3,360,284
Patented Dec. 26, 1967

3,360,284
SPLIT T
Burton Ver Nooy, Broken Arrow, Okla., assignor to
T. D. Williamson, Inc., Tulsa, Okla.
Filed Jan. 9, 1967, Ser. No. 607,937
3 Claims. (Cl. 285—110)

ABSTRACT OF THE DISCLOSURE

A split T for installation around a pipe to make a lateral connection to the pipe. The T includes a run and a branch. The run is split longitudinally for fitting around the pipe with the branch attached to one of the run members and communicating with the interior of the run through an opening in the run member. The run member to which the branch is attached is provided with a recess that forms a cavity between the inside of the run and the pipe when the T is installed. A back-up member of flexible material is positioned in the cavity. This member has an opening that is concentric with the openings in the side of the run member and the one to be cut in the pipe, and is larger in diameter than both. A seal ring is located in the cavity in engagement with the backup member to encircle the opening in the pipe and to seal between the run and the pipe.

---

This invention relates to a split T adapted to be mounted on a length of pipe so that the pipe can be hot tapped to provide at least one lateral branch therefrom.

Split T's are useful in many applications, and particularly when "hot tapping" pipelines. Pipelines are hot tapped when lateral openings are cut in the pipe, while the line is in service. Usually, this is done by attaching a split T to the pipe, installing a valve on the branch of the T, and mounting a hot tapping machine on the valve. The hot tapping machine is designed to extend a cutter through the valve to cut a coupon from the wall of the pipe, after which, the cutter carrying the coupon is retracted through the valve. The valve is then closed, the hot tapping machine removed, and the lateral connection completed.

Basically, split T's used for this purpose have their run sections split longitudinally into at least two semiannular pieces or run members, which can be positioned around the pipe. When in position the run members are either welded or bolted together to hold the T in place. One of the run members has a branch attached to it, through which the tapping machine can cut a hole in the side of the pipe.

The big problem with split T's is providing a seal between the split T and the pipeline. If the T can be welded completely to the pipeline initially, before the line is tapped, no problem exists. In many situations, however, a welded on type split T cannot be employed. For example, plastic pipe does not permit high temperature welding. Further, conditions around the pipeline, such as the presence of combustible fluids that have leaked from the pipeline, may make immediate welding operations hazardous, requiring that they be postponed until after the line is tapped and the combustible fluids removed from the area. This situation arises frequently where the line is being tapped on opposite sides of a leak in the pipe to provide a bypass around the leak to restore pipeline service and stop the leakage as fast as possible. Also, in emergencies such as this, it is advantageous to be able to attach the bypass around the leak by hot tapping the line without having to await the arrival of welders and their equipment.

One of the big problems with split T's that are not integrally welded to the line has been the seal between the T and the line. One method of providing such a seal is shown in my co-pending patent application Serial Number 529,822, filed February 24, 1966, and entitled "Split T" and assigned to the same assignee as this application. In this application the split T is provided with semicircular seals that seal between the ends of the run members and the pipe and longitudinal seals that extend between the end seals and provide a seal between the abutting longitudinal edge surfaces of the run members. All of these seals, of course, must be connected together, as the T is assembled around the pipe to keep fluid from leaking between their abutting ends. This is done by the use of an adhesive or solvent depending upon the material from which the seals are made. A seal so constructed, can only be a temporary seal, of course, and after the line has been tapped, it is the usual practice to weld the T to the pipe completely so that this glued together seal will not be relied upon to keep fluid from leaking from the T.

If a seal was located between the run and pipe to encircle the opening in the pipe it could keep fluid from leaking from the T. Such a seal would need to follow the curve formed by the intersection of two cylinders. A seal of flexible material, such as a rubber O-ring can do this. The groove for such a seal, however, is another matter. Machining, casting, or molding the groove in the run member is difficult and expensive.

Therefore, it is an object of this invention to provide a split T that can be sealed around a lateral opening in a pipe by a circular seal of integral construction.

It is another object of this invention to provide a split T in which an integral circular seal is employed to confine the fluid flowing from the pipe through the branch of the T, and which can be easily machined, molded, or cast.

These and other objects, advantages, and features of the invention will be apparent to one skilled in the art upon a consideration of this specification and attached drawings.

The preferred embodiment of the split T of this invention will now be described in detail in connection with the attached drawings in which, FIGURE 1 is a side view, partially in elevation and partially in vertical section, of the split T installed on a length of pipe;

FIGURE 2 is a sectional view taken along line 2—2 of FIGURE 1;

FIGURE 3 is a plan view of the run member to which the branch is connected looking from the side away from the branch;

FIGURE 4 is a plan view of the seal back-up member employed with the T of this invention;

FIGURE 5 is a sectional view through the back-up member taken along line 5—5 of FIGURE 4; and FIGURES 6 and 7 are alternate embodiments of the back-up member and seal ring of this invention.

The split T is mounted on pipe 20, as shown in FIGURES 1 and 2. It includes a run that is split longitudinally into first and second run members 10 and 11. The run members have arcuate internal surfaces 10a and 11a, respectively, which in this embodiment are semicircular. The radius of curvature of these surfaces is substantially equal to that of the pipe upon which the members are to be mounted.

Each run member has longitudinal edge surfaces that are adjacent the edge surfaces of the other member, when the members are mounted on the pipe. Thus, run member 10 has edge surfaces 12a and 12b, which are adjacent edge surfaces 13a and 13b of run member 11, when the T is assembled, as shown in FIGURE 2. Preferably, the members are designed so that when the adjacent edge surfaces are pulled toward each other by machine screws 14, they clamp the run members around the pipe. For this purpose, run member 10 is relatively thick adjacent its edge surfaces 12a and 12b to accommodate tapped holes 15 for receiving machine screws 14. Run member 11 on the other hand is provided with an outwardly extending lateral flange 16, which is provided with holes 16a through which the machine screws extend into tapped holes 15.

A portion 18 of the internal surface of first run member 10 has an increased radius of curvature to form a recess. With the run member installed on pipe 20, this portion of the internal surface of the member will be spaced from the outside surface of pipe 20 and form arcuate cavity 22. The cavity is bounded by facing end surfaces 18a and 18b at the end of the recessed portion and portions of edge surfaces 13a and 13b of the second run member 11.

Lateral opening 24 is located in the side of first run member 10 and intersects the recessed portion 18 of the internal surface of the run member. Branch 26 is attached to the first run member and is connected to the inside of the run through opening 24.

To provide a seal between the split T and pipe 20, back-up member 30 is located in cavity 22. Preferably, the back-up member is made of a flexible material, such as one of the elastomers. Then it can be formed flat, as shown in FIGURE 4, and conformed to the curvature of the outside surface of pipe 20, when placed in cavity 22. Also, preferably, the dimensions of back-up member 30 are such that it will substantially fill the cavity.

The back-up member is provided with opening 32 that is concentric with opening 24 and of a larger diameter. When the back-up member is flat opening 32 is elliptical so it will encircle opening 24 when installed. To provide the seal between the split tee and pipe 20, seal ring 34 is located in cavity 22 to sealingly engage run member 10 around opening 24 and the outside surface of pipe 20. In the embodiment shown, seal ring 34 is integrally connected to back-up member 30, as shown in FIGURE 5. It comprises a concave surface on the edge surface of opening 32 of the member to provide it with sealing lips 34a and 34b. These lips will be forced outwardly into sealing engagement with the pipe and run member when a pressure differential exists across the seal.

Alternate embodiments of the back-up ring and seal combination are shown in FIGURES 6 and 7. In FIGURE 6 the seal ring 34' is still integrally connected to back-up member 30'; however, sealing lips 34a' and 34b' are further apart so that when the T is assembled on the pipe, they will be forced together causing them to exert an initial force on the outside surface of the pipe and the internal surface of the run member due to their own resiliency.

In FIGURE 7, seal ring 34" comprises a conventional O-ring that is not connected to back-up ring 30", but is simply held in position by the back-up member. With this arrangement, back-up member 30 can be made of a variety of materials different from seal ring 34. For example, the back-up member can be made of a relatively stiff material and pre-formed to fit cavity 22. This arrangement would be particularly advantageous, where the split T is to be used to contain relatively high pressures.

With the split T in place, as shown in FIGURES 1 and 2, opening 20a can be drilled in the side of pipe 20 by a hot tapping machine (not shown) and a lateral connection made to the pipe.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A split T adapted to be mounted on and to encircle a length of pipe, comprising a run having first and second run members, each of which has a semicircular internal surface with a radius of curvature substantially equal to that of the pipe the members are to encircle and longitudinal edge surfaces that substantially abut the longitudinal edge surfaces of the other member when the members are positoned to encircle a pipeline, means for holding the members mounted on a pipe with their longitudinal edges substantially abutting, the internal surface of the first run member having an outwardly enlarged recess extending from one longitudinal edge surface to another and intermediate oppositely facing surfaces at its ends to provide an arcuate cavity between the member and the pipe when the member is mounted thereon, said cavity being bounded on the ends by the end surfaces of the recess and on the sides by the longitudinal edge surfaces of the second run member, said first run member further having a lateral opening intersecting the recess, a branch attached to the first member and connected to the interior of the run through the opening, means substantially filling the cavity for sealing between the pipe and first run, said sealing means including a back-up portion having outer edges engaging the end surfaces of said recess in the first run member and the longitudinal edge surfaces of the second run member, and a pressure energized seal portion having inner edges defining an opening aligned with the lateral opening in said first run, said sealing means being flexible from a substantially flat, rectangular shape, in which the opening therein is laterally elongated, into an arcuate shape for disposal within said cavity.

2. The split T of claim 1 in which the seal portion is integral with the back-up portion.

3. The split T of claim 1 in which the back-up portion and seal portion are made of the same elastomeric material.

References Cited

UNITED STATES PATENTS

| 1,278,128 | 10/1918 | Flower | 285—197 |
| 2,795,439 | 6/1957 | Smith | 285—199 X |
| 2,936,186 | 5/1960 | Dunmire | 285—373 |
| 3,302,953 | 2/1967 | Glasgow | 285—363 X |

FOREIGN PATENTS

| 1,213,010 | 10/1959 | France. |
| 1,213,179 | 3/1966 | Germany. |

CARL W. TOMLIN, *Primary Examiner.*

RICHARD G. BERKLEY, *Assistant Examiner.*